United States Patent [19]

Lee

[11] Patent Number: 5,711,122
[45] Date of Patent: Jan. 27, 1998

[54] SUPPORTING DEVICE FOR SUPPORTING A FLOOR FORM ASSEMBLY ON SURROUNDING WALLS OF A STRUCTURE

[76] Inventor: Wen-Yuan Lee, 7F-3, No. 8, Lane 390, Sec. 1, Chien-Kang Rd., Tainan City, Taiwan

[21] Appl. No.: 623,881

[22] Filed: Mar. 29, 1996

[51] Int. Cl.[6] ............................................. E04B 1/00
[52] U.S. Cl. .............................. 52/283; 52/702; 52/707; 403/230; 403/262
[58] Field of Search ............................ 52/283, 702, 704, 52/706, 707, 289, 932, 708, 698; 248/223.41, 224.51, 220.21; 403/230, 262

[56] References Cited

U.S. PATENT DOCUMENTS

| | | | |
|---|---|---|---|
| 4,158,940 | 6/1979 | Lancelot, III et al. | 52/702 |
| 4,951,438 | 8/1990 | Thoresen | 52/283 X |
| 5,548,939 | 8/1996 | Carmical | 52/704 X |

Primary Examiner—Creighton Smith
Attorney, Agent, or Firm—Birch, Stewart, Kolasch Birch, LLP

[57] ABSTRACT

A supporting device is used to support a floor form assembly on surrounding walls of a structure and includes a plurality of hangers fixed spacedly to the surrounding walls in a horizontal plane. Each of the hangers has a first engaging portion. An elongated mounting seat has a generally U-shaped cross section which has a first arm side, a second arm side, a base side, and an open side opposed to the base side so that the hangers can pass through the open side of the mounting seat. The first arm side has a second engaging portion so that the first engaging portions of the hangers can engage the second engaging portion in order to retain the mounting seat to the hangers. A fastening apparatus is mounted to the external face of the base side of the mounting seat. A support member is secured to the mounting seat by the fastening apparatus. The support member has a top portion which is formed with a supporting plate so that the floor form assembly can be rested on the supporting plate.

10 Claims, 5 Drawing Sheets

SUPPORTING DEVICE FOR SUPPORTING A FLOOR FORM ASSEMBLY ON SURROUNDING WALLS OF A STRUCTURE

BACKGROUND OF THE INVENTION

1. Field of the Invention

This invention relates to a supporting device for supporting a floor form assembly on surrounding walls of a structure, more particularly to a supporting device which can be used to support concrete floors of different thicknesses and to facilitate dismantling the floor form assembly when the concrete floor is formed.

2. Description of the Related Art

The applicant has disclosed in U.S. patent application Ser. No. 08/512,645, filed on a Aug. 8, 1995, a floor form assembly 1 adapted for use in the construction of a concrete floor of a structure that is enclosed by surrounding walls 13, as shown in FIG. 1. The floor form assembly 1 comprises a plurality of form units 10 and a plurality of intersecting supporting ribs 11 and girders 12 in order to support the form units 10 thereon. Referring to FIG. 2, when using the floor form assembly 1 in the construction of the concrete floor of the structure, a plurality of L-shaped mounting pieces 14 which are secured initially to the top portion of the surrounding walls 13. The floor form assembly 1 is then hoisted into the top portion of the surrounding walls 13 to permit the ends of the supporting ribs 11 or girders 12 to rest on the mounting pieces 14. If desired, a plurality of props 15 are disposed between the floor form assembly and the ground surface (or floor) of the lower story. Thereafter, concrete is poured on the floor form assembly 1 to construct the floor 16 of the upper story.

However, the conventional mounting pieces 14 suffer from the following disadvantages:

1. When securing to the walls, the upper arm portion of each of the L-shaped mounting pieces 14 must be kept in a horizontal state, resulting in increasing the working time.

2. The thickness of the floor 16 (the thickness measured below the base line F.L) should be varied according to the specification requirements of the structure. However, the conventional mounting pieces 14 can be only used in cooperation with the floor form assembly to form a floor of a fixed thickness.

3. When the floor form assembly 1 is to be dismantled after the concrete has been hardened, because the floor form assembly 1 is sandwiched between the hardened concrete floor 16 and the mounting pieces 14, dismantling the floor form assembly 1 is relatively difficult.

SUMMARY OF THE INVENTION

It is therefore an object of the present invention to provide a supporting device which can be mounted easily and quickly to the surrounding walls of a structure.

Another object of the provide a supporting device which can be selectively used in cooperation with a floor form assembly to form at least two concrete floors of different thicknesses.

Still another object of the present invention is to provide a supporting device which can allow the floor form assembly to be dismantled easily when the concrete floor is formed.

According to the present invention, a supporting device is adapted to support a floor form assembly on surrounding walls of a structure and comprises:

a plurality of hangers fixed spacedly to a top portion of the surrounding walls in a horizontal plane, each of the hangers having a top face that is formed with a first engaging portion;

an elongated mounting seat having a generally U-shaped cross section which has a first arm side, a second arm side, a base side that interconnects the first and second arm sides, a receiving space confined between the base side and the first and second arm sides, and an open side opposed to the base side so that the hangers can pass through the open side of the mounting seat and be received in the receiving space, the first arm side having an internal face which is formed with a second engaging portion so that the first engaging portions of the hangers can engage the second engaging portion when the hangers are received in the receiving space and the first arm side is located over the second arm side of the mounting seat in order to retain the mounting seat to the hangers;

a fastening apparatus mounted to an external face of the base side of the mounting seat; and a support member which is secured to the mounting seat by the fastening apparatus, the support member having a top portion which is formed with a supporting plate so that the floor form assembly can be rested on the supporting plate.

Preferably, each of the hangers is formed as a disk and has an annular groove which formed in the circular periphery of the disk and which serves as the first engaging portion. Therefore, the hangers can be secured quickly to the surrounding walls without the need for keeping the first engaging portion in a fixed orientation.

Preferably, the fastening apparatus is mounted adjacent to the first arm side. The second arm side has an internal face which is formed with a third engaging portion that is opposed to the second engaging portion so that the third engaging portion of the mounting seat can engage the first engaging portions of the hangers when the mounting seat is turned upside down such that the second arm side is located over the first arm side and is retained on the hangers. Therefore, the supporting device can be used to support the floor form assembly at a second height in order to form a concrete floor of a second thickness.

Furthermore, the fastening apparatus comprises an elongated tube fixed to the external face of the base side of the mounting seat. The tube has a longitudinal axis parallel to that of the mounting seat. The tube further has a longitudinal slit which is opposite to the base side of the mounting seat. A locking device has a nut member which is received slidably and nonrotatably in the tube, and a locking bolt which has a head and a threaded shaft that is connected to the head and that extends through the longitudinal slit of the tube so as to engage the nut member. In addition, the support member has a positioning plate which extends downward from the supporting plate. The positioning plate has an elongated vertical opening through which the threaded shaft of the locking bolt extends so that the positioning plate can be secured releasably to the tube by means of loosening or tightening the locking bolt. When the locking bolt is loosened, the support member can move up and down along the vertical opening.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

BRIEF DESCRIPTION OF THE DRAWINGS

Other features and advantages of this invention will become apparent in the following detailed description of the preferred embodiments of this invention with reference to the accompanying drawings which are given by way of illustration only, and thus are not limitative of the present invention, and in which.

DETAILED DESCRIPTION OF THE PREFERRED EMBODIMENTS

Figure 1:
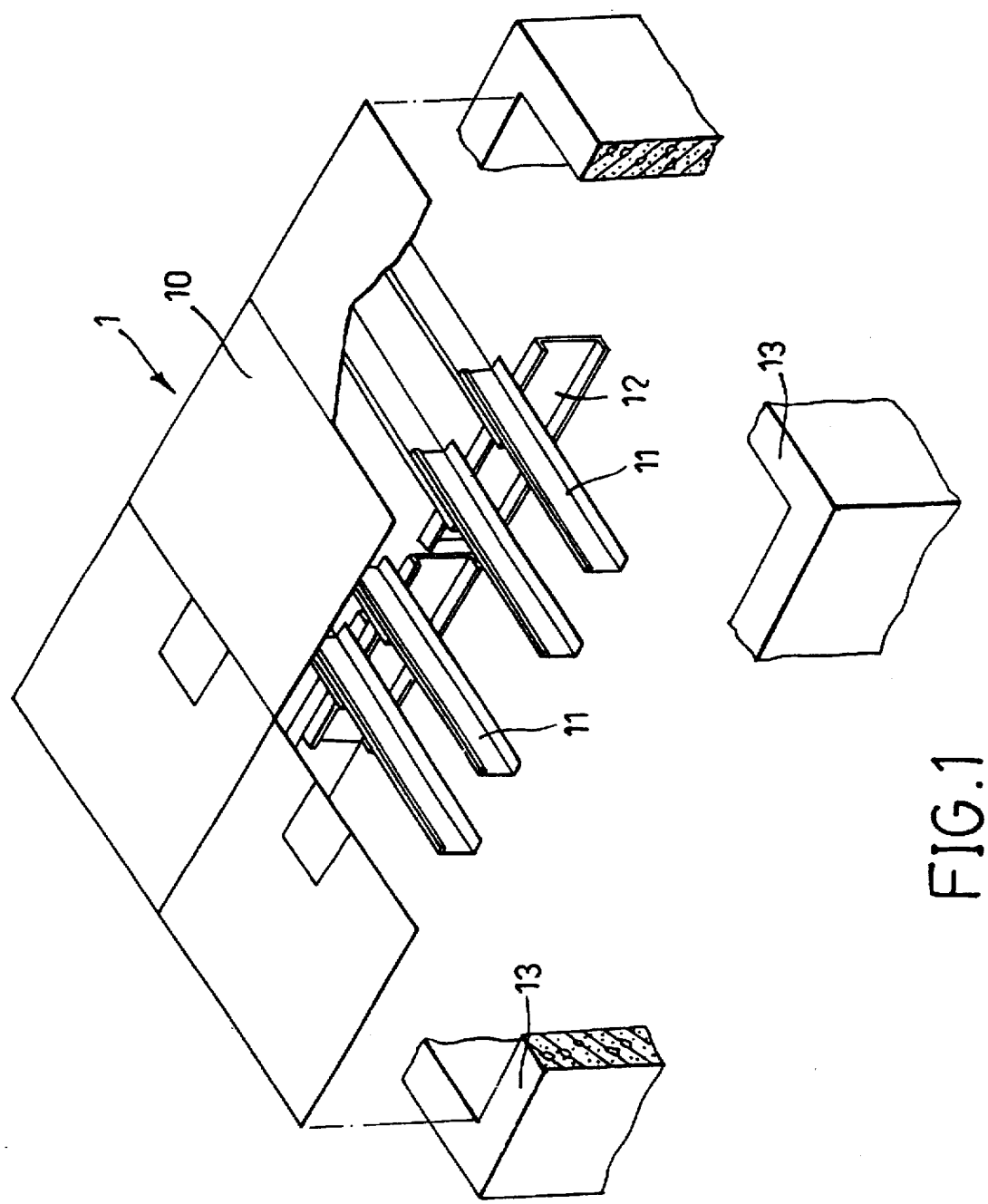
FIG. 1 is an exploded perspective view illustrating a floor form assembly which is to be hoisted into the top portion of surrounding walls of a structure.
Figure 2:
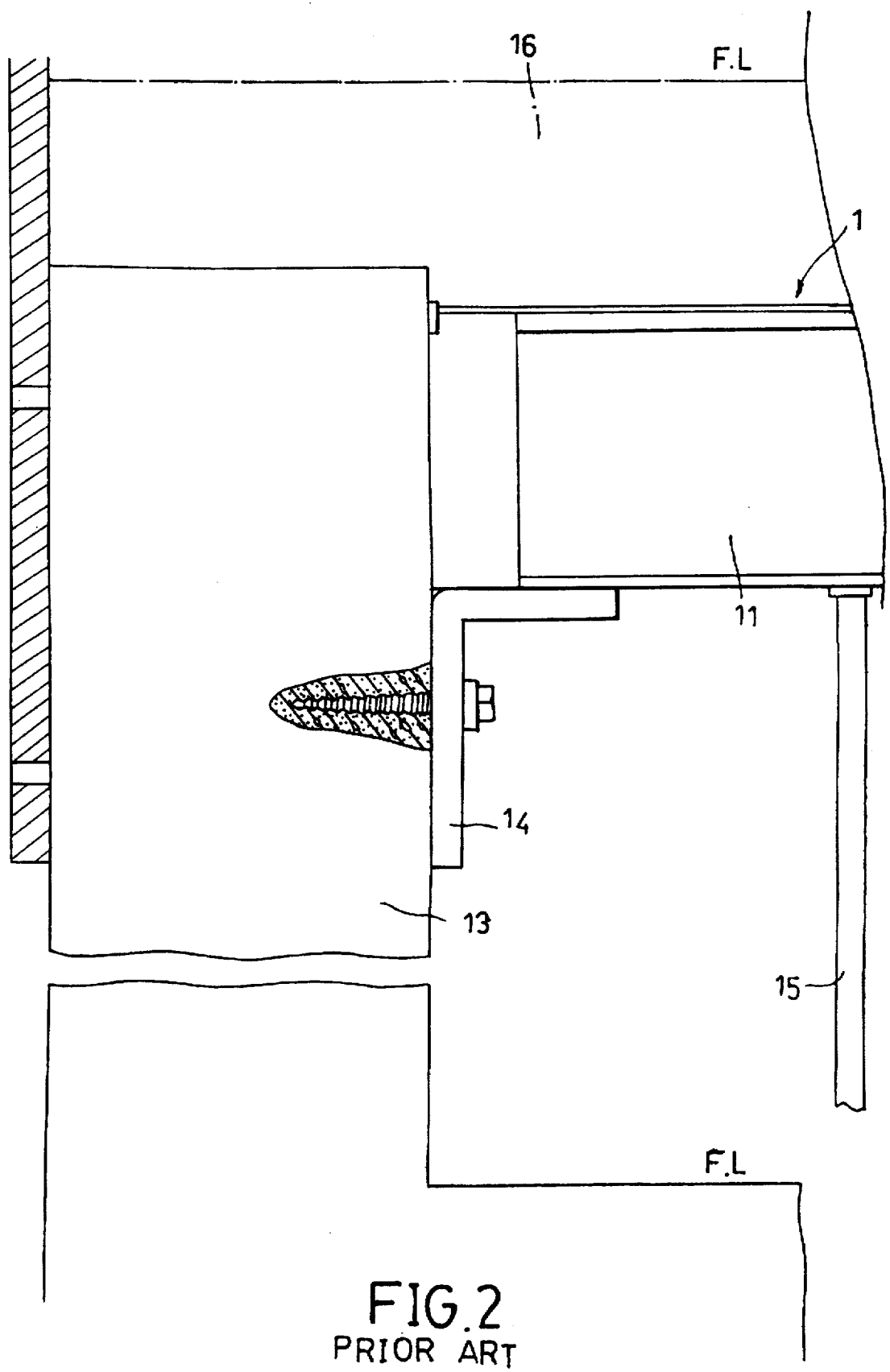
FIG. 2 is a sectional schematic view illustrating how a conventional supporting device is used to support the floor form assembly of FIG. 1.
Figure 3:
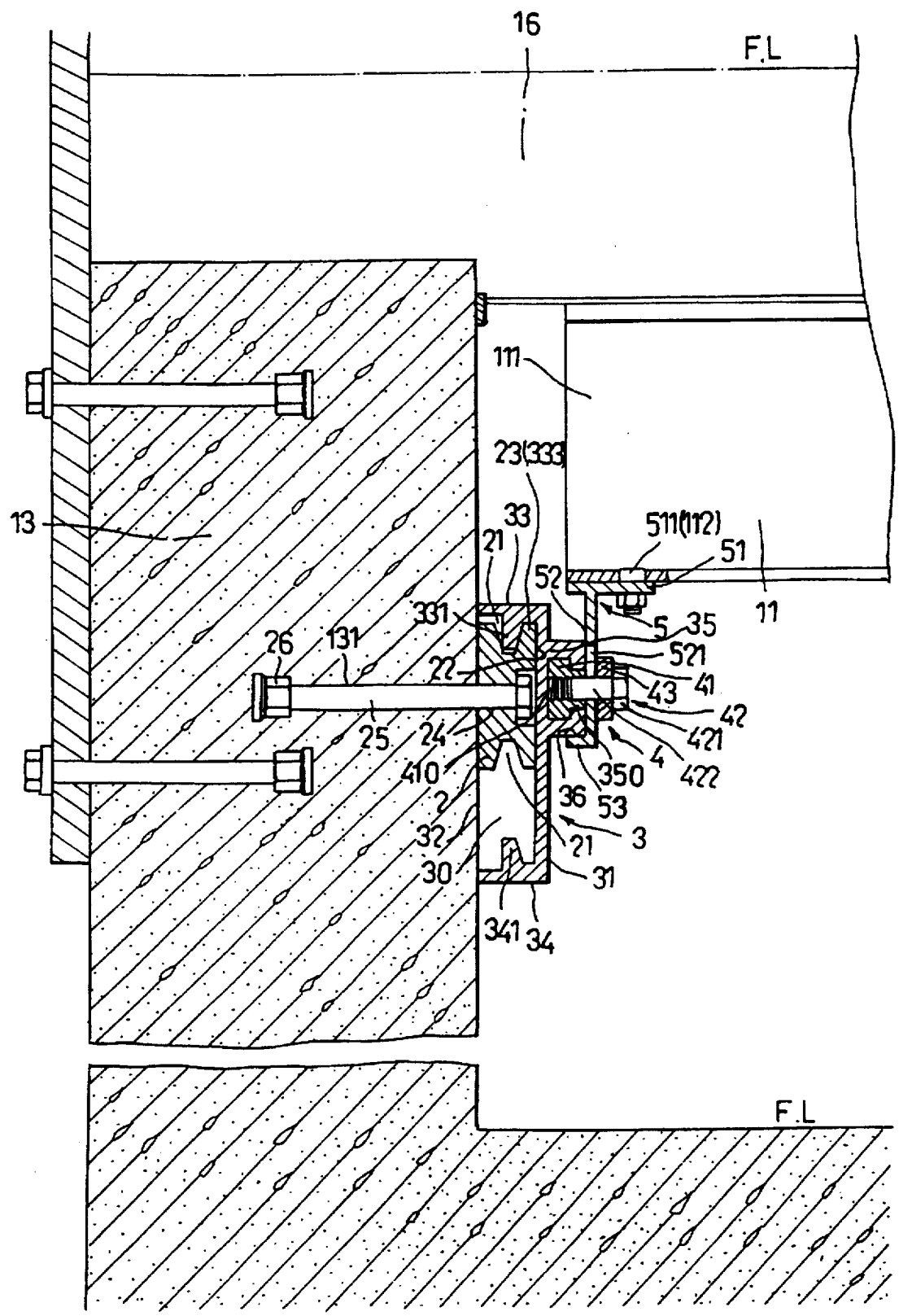
FIG. 3 is a sectional side view illustrating a preferred embodiment of a supporting device for supporting a floor form assembly on surrounding walls of a structure according to the present invention.

Referring to FIG. 3, a preferred embodiment of a supporting device according to the present invention is shown to be used to support the end 111 of a supporting rib 11 of a floor form assembly 1 on the surrounding walls 13. The supporting device comprises a plurality of hangers 2 (only one is shown), an elongated mounting seat 3, a fastening apparatus 4, and a support member 5.

Each of the hangers 2 is formed as a disc with a given thickness. The circular periphery of the disc has an annular groove 21, serving as a first engaging portion. The annular groove 21 is tapered radially and inwardly form the circular periphery of the disc. An annular flange 23 is formed adjacent to the outside face 22 of the hanger 2. A central through hole 24 is formed in the hanger 2. To secure the hanger 2 to the wall 13, a bolt 25 with a hexagonal head extends through the central through hole 24 and a blind hole 131 which is preformed in the wall 13 and engages a nut 26 which is fixed to the bottom end of the blind hole 131.

Figure 5:
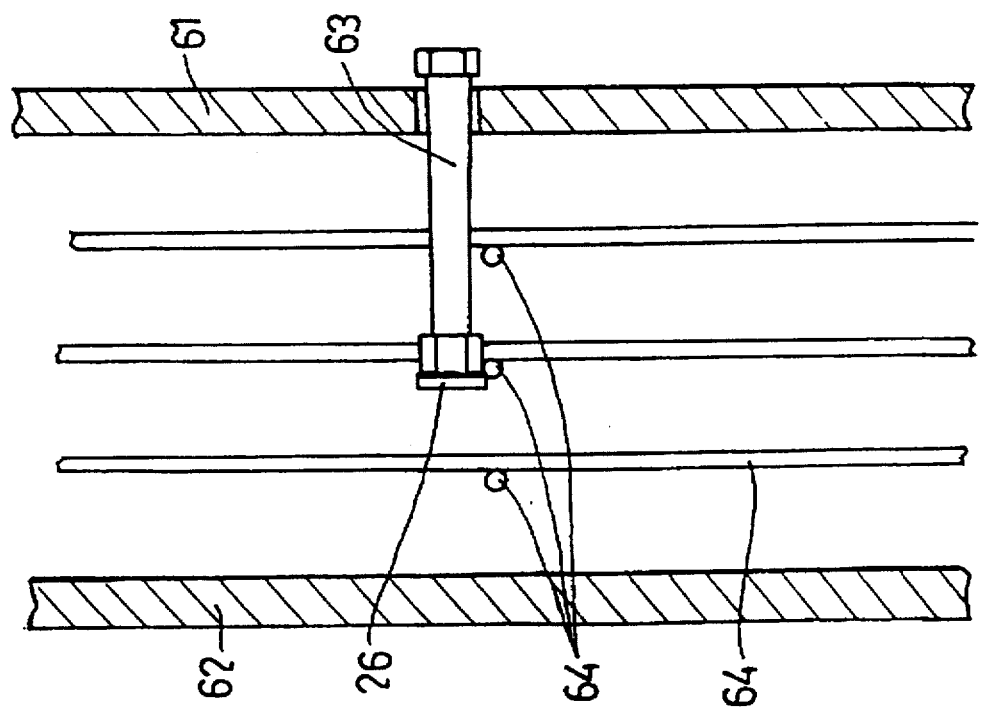
FIG. 5 is a sectional side view illustrating how a nut and a blind hole are preformed in the surrounding walls of the structure.

FIG. 5 illustrates how the blind hole 131 is formed and the nut 26 is fixed in the wall 13. The nut 26 and a threaded shaft 63 are fixed to the reinforcing steel rods 64 which are arranged between the inner and outer vertical form panels 61 and 62. The distal end of the threaded shaft 63 engages the nut 26. The threaded shaft 63 is removed out from the concrete wall after the concrete has been hardened, thus forming the blind hole 131 and positioning the nut 26 in the bottom end of the blinding hole 131.

The hangers 2 are fixed spacedly to the top portion of the surrounding walls 13 in a horizontal plane. Since each of the hangers 2 is disk-shaped with an annular engaging portion, the hangers 2 can be secured quickly to the surrounding walls 13 by means of the bolt 25 without the need for keeping the first engaging portion 21, i.e. the annular groove at a fixed orientation, resulting reduction of the working time.

The mounting seat 3 has a generally U-shaped cross section which has a first arm side 33, a second arm side 34, a base side 31 that interconnects the first and second arm sides 33, 34, a receiving space 30 confined between the base side 31 and the first and second arm sides 33, 34, and an open side 32 opposed to the base side 31 so that a number of the hangers 2 can pass through the open side 32 of the mounting seat 3 and be received in the receiving space 30. As shown in FIG. 3, the first arm side 33 is located over the second arm side 34. The first arm side 33 has an internal face which is formed with a second engaging portion 331 which is formed as a tapered projection and which engages the first engaging portions 21 of the hangers so that the first engaging portions 21 of the hangers 2 can engage the second engaging portion 331 when the hangers 2 are received in the receiving space 30 in order to retain the mounting seat 3 on the hangers 2. The annular flanges 23 of the hangers 2 are matingly fitted into the space 333 between the tapered projection 331 and the base side 31 in order to keep the first arm side 33 in a horizontal position. The internal face of the second arm side 34 is formed with a third engaging portion 341 which is also formed as a tapered projection that is symmetric to the second engaging portion 331.

The fastening apparatus 4 is mounted to the external face of the base side 31 of the mounting seat 3. The fastening apparatus 4 has an elongated rectangular tube 35 which is fixed to the external face of the base side 33 of the mounting seat 3. The tube 35 has a longitudinal axis parallel to that of the mounting seat 3. The tube 35 further has a longitudinal slit 350 which is opposite to the base side 31 of the mounting seat 3. The tube 35 has at least one open end. A locking device has a rectangular nut member 41 with a threaded hole 410. The nut member 41 is received slidably and nonrotatably in the tube 33 via the open end of the tube 35. The locking device further has a locking bolt 42 which has a hexagonal head 421 and a threaded shaft 422 that is connected to the head 421 and that extends through the longitudinal slit 350 of the tube 35 so as to engage the threaded hole 410 of the nut member 41.

The support member 5 is generally Z-shaped and has a top portion which is formed with a supporting plate 51 so that the end 111 of the supporting rib 11 of the floor form assembly can be rested on the latter. A engaging pin 511 is formed on the top face of the supporting plate 51 in order to be inserted into a positioning hole 112 of the supporting rib 11, thereby holding the supporting rib 11 in place. A positioning plate 52 extends downward from the supporting plate 51 a predetermined length. The intermediate portion of the positioning plate 52 has an elongated vertical opening 521 through which the threaded shaft 422 of the locking bolt 42 extends so that the positioning plate 52 can be secured releasably to the tube 35 by means of loosening or tightening the locking bolt 42. A washer 43 is disposed between the head 421 of the locking bolt 42 and the positioning plate 52 and is passed through by the threaded shaft 422. When the locking bolt 42 is loosened, the support member 5 can move up and down along the vertical opening 521 relative to the mounting seat 3. A horizontal side plate 53 extends from the lower end of the positioning plate 52. The side plate 53 abuts against the external bottom face 36 of the tube 35 when the positioning plate 52 is secured to the tube 35.

In assembly, the hangers 2 are fixed in the preformed blind holes 131 and engage with the nut 26 in a horizontal plane. A plurality of the nut members 41, the locking bolts 42 and the washers 43 are assembled with a plurality of support members 5 in the aforementioned manner on the ground of the working site. The nut members 5 are then fitted in the tube 35 and spaced from one another at a predetermined distance. The support members 5 are pushed upward to allow the side plate 53 to abut against the external bottom face 36 of the tube 35 so that the supporting plate 51 can be located at the same height. The locking bolts 42 are then tightened in order to secure the support member 5 to the mounting seat 3. Thereafter, the mounting seat 3 is hooked onto a plurality of the hangers 2 which are fixed to the surrounding walls 13 to permit firm engagement of the first and second engaging portions 21, 331. Thereby, the mounting seat 3 can be connected securely to the surrounding walls 13. At this state, the ends 111 of the supporting ribs 11 of the floor form assembly 1 can be supported on the support members 5.

When the floor form assembly 1 is to be dismantled, because the concrete has been hardened, the form panels of the floor form assembly must be first separated from the bottom face of the concrete floor 16 in order to facilitate the removal of the floor form assembly. In accordance with the present invention, the form panels can be separated from the concrete floor 16 by loosening the locking bolts 42 one by one to allow the support members 5 to descend along the vertical openings 521 by gravity. When all of the locking bolts 42 are loosened, the floor form assembly can be detached completely from the bottom face of the concrete floor 16 and still be supported on the support members. Therefore, the floor form assembly can be removed easily away from the concrete floor 16.

Figure 4:
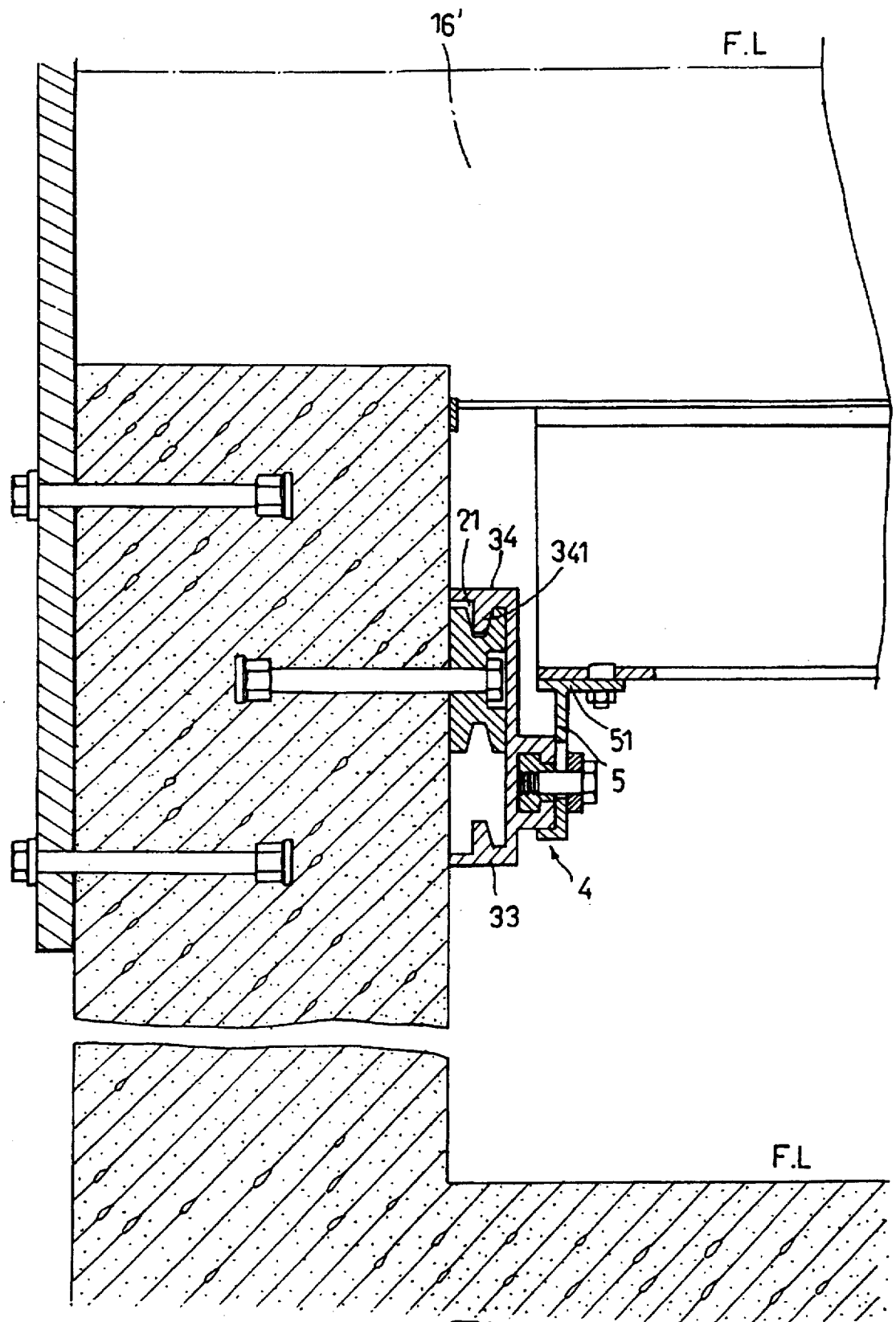
FIG. 4 is a sectional side view illustrating how the preferred embodiment of the supporting device is used to support a floor form assembly in order to form a concrete floor having a second thickness with respect to that of the concrete floor shown in FIG. 3.

Referring to FIG. 4, the third engaging portion 341 of the mounting seat 3 can engage the first engaging portion 21 of the hangers 2 when the mounting seat is turned upside down such that the second arm side 34 is located over the first arm side 33. In this case, the fastening apparatus 4 is lowered than that of the first embodiment shown in FIG. 3. Therefore, the supporting device can be used to support the floor form assembly at a lower position with respect to that of the first embodiment in order to form a concrete floor 16' of a larger thickness.

Figure 6:
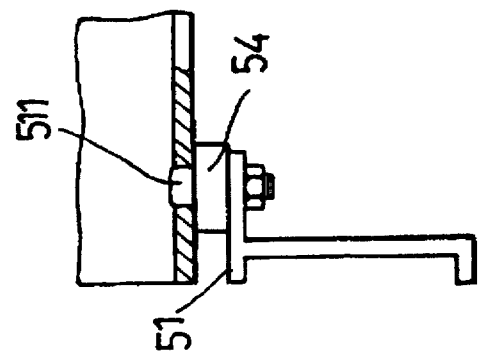
FIG. 6 is a sectional side view illustrating how the thickness of the concrete floor to be formed by the floor form assembly is adjusted by means of a washer according to the present invention.

Referring to FIG. 6, a washer 54 of a given thickness may be disposed on the positioning pin 511 in order to adjust the thickness of the concrete floor to be formed. Therefore, concrete floors of different thicknesses can be formed with the floor form assembly by means of inverting the first and second arm sides 33, 34 and disposing washers of different thicknesses.

The advantages of the support device of the present invention are as follows:

1. The hangers 2 can be quickly fixed to the surrounding walls 13 without considering the orientations thereof.

2. Concrete floors of different thicknesses can be formed simply by means of inverting the arm sides 33, 34 of the mounting seat 3.

3. The form panels of the floor form assembly can be easily separated from the bottom face of the concrete floor by means of loosening the locking bolts 42 to allow the support members 5 to descend by gravity.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangement.

I claim:

1. A supporting device for supporting a floor form assembly on surrounding walls of a structure, said supporting device comprising:

a plurality of hangers capable of being fixed spacedly to a top portion of the surrounding walls in a horizontal plane, each of said hangers having a top face that is formed with a first engaging portion;

an elongated mounting seat having a generally U-shaped cross section which has a first arm side, a second arm side, a base side that interconnects said first and second arm sides, a receiving space confined between said base side and said first and second arm sides, and an open side opposed to said base side, said hangers passing through said open side of said mounting seat and being received in said receiving space, said first arm side having an internal face which is formed with a second engaging portion, said first engaging portions of said hangers engaging said second engaging portion when said hangers are received in said receiving space and said first arm side is located over said second arm side of said mounting seat in order to retain said mounting seat to said hangers;

a fastening apparatus mounted to an external face of said base side of said mounting seat; and a support member which is secured to said mounting seat by said fastening apparatus, said support member having a top portion which is formed with a supporting plate.

2. The supporting device as claimed in claim 1, wherein said fastening apparatus is mounted adjacent to said first arm side, said second arm side having an internal face which is formed with a third engaging portion that is opposed to said second engaging portion, said third engaging portion of said mounting seat engaging said first engaging portions of said hangers when said mounting seat is retained on said hangers and said second arm side is located over said first arm side.

3. The supporting device as claimed in claim 1, wherein said fastening apparatus comprises:

an elongated tube fixed to said external face of said base side of said mounting seat, said tube having a longitudinal axis parallel to that of said mounting seat, said tube further having a longitudinal slit which is opposite to said base side of said mounting seat; and a locking device having a nut member which is received slidably and nonrotatably in said tube, and a locking bolt having a head and a threaded shaft which is connected to said head and which extends through said longitudinal slit of said tube so as to engage said nut member; and wherein said support member has a positioning plate which extends downward from said supporting plate, said positioning plate having an elongated vertical opening through which said threaded shaft of said locking bolt extends, said positioning plate being secured releasably to said tube by loosening and tightening said locking bolt.

4. The supporting device as claimed in claim 2, wherein said fastening apparatus comprises:

an elongated tube fixed to said external face of said base side of said mounting seat, said tube having a longitudinal axis parallel to that of said mounting seat, said tube further having a longitudinal slit which is opposite to said base side of said mounting seat; and a locking device having a nut member which is received slidably and nonrotatably in said tube, and a locking bolt having a head and a threaded shaft which is connected to said head and which extends through said longitudinal slit of said tube so as to engage said nut member; and wherein said support member has a positioning plate which extends downward from said supporting plate, said positioning plate having an elongated vertical opening through which said threaded shaft of said locking bolt extends, said positioning plate being secured releasably to said tube of loosening and tightening said locking bolt.

5. The supporting device as claimed in claim 1, wherein each of said hangers is formed as a disc and wherein said first engaging portion is an annular groove which is formed in a circular periphery of said disc.

6. The supporting device as claimed in claim 2, wherein each of said hangers is formed as a disc and wherein said first engaging portion is an annular groove which is formed in a circular periphery of said disc.

7. The supporting device as claimed in claim 5, wherein each of said second and third engaging portions is formed as a tapered projection which engages correspondingly said annular groove of said disc.

8. The supporting device as claimed in claim 6, wherein each of said second and third engaging portions is formed as a tapered projection which engages correspondingly said annular groove of said disc.

9. The supporting device as claimed in claim 3, wherein said tube has a horizontal external bottom face and wherein said positioning plate has a horizontal side plate which extends from a lower end of said positioning plate, said side plate of said supporting member abutting against said external bottom face of said tube when said positioning plate is secured to said tube.

10. The supporting device as claimed in claim 4, wherein said tube has a horizontal external bottom face and wherein said positioning plate has a horizontal side plate which extends from a lower end of said positioning plate, said side plate of said supporting member abutting against said external bottom face of said tube when said positioning plate is secured to said tube.

* * * * *